United States Patent

Yao-Yuan et al.

(10) Patent No.: US 9,285,100 B2
(45) Date of Patent: Mar. 15, 2016

(54) LENS STRUCTURE FOR A VEHICULAR LAMP

(71) Applicants: Kuo Yao-Yuan, Tainan (TW); Tai Shang-Kuei, Taipei (TW)

(72) Inventors: Kuo Yao-Yuan, Tainan (TW); Tai Shang-Kuei, Taipei (TW)

(73) Assignee: MIN HSIANG CORPORATION, Tainan (TW)

( * ) Notice: Subject to any disclaimer, the term of this patent is extended or adjusted under 35 U.S.C. 154(b) by 103 days.

(21) Appl. No.: 14/456,764

(22) Filed: Aug. 11, 2014

(65) Prior Publication Data

US 2016/0040845 A1  Feb. 11, 2016

(51) Int. Cl.

| F21V 7/00 | (2006.01) |
|---|---|
| F21V 7/04 | (2006.01) |
| F21S 8/10 | (2006.01) |
| F21V 5/04 | (2006.01) |
| F21V 13/04 | (2006.01) |

(52) U.S. Cl.
CPC .................. *F21V 7/048* (2013.01); *F21S 48/00* (2013.01); *F21S 48/1341* (2013.01); *F21S 48/1347* (2013.01); *F21S 48/1376* (2013.01); *F21V 5/04* (2013.01); *F21V 13/04* (2013.01)

(58) Field of Classification Search
CPC .............. F21S 48/1341; F21S 48/1347; F21S 48/1376; F21V 7/048; F21V 5/00; F21V 5/002; F21V 5/004; F21V 5/005; F21V 13/04; F21V 13/045
USPC .................................................. 362/516, 518
See application file for complete search history.

(56) References Cited

U.S. PATENT DOCUMENTS

| 5,136,483 | A | * | 8/1992 | Schoniger | ............. | E01F 9/0165 |
| | | | | | | 362/231 |
| 6,102,553 | A | * | 8/2000 | Ting | ....................... | G02B 27/20 |
| | | | | | | 353/101 |
| 6,471,368 | B1 | * | 10/2002 | Lin | ....................... | B60Q 1/0052 |
| | | | | | | 362/216 |
| 7,144,144 | B2 | * | 12/2006 | Hsu | ....................... | B60Q 1/0052 |
| | | | | | | 362/245 |
| 7,246,917 | B2 | * | 7/2007 | Rhoads | .................. | F21V 7/0025 |
| | | | | | | 362/241 |
| 7,287,876 | B2 | * | 10/2007 | Lin | ....................... | B60Q 1/0052 |
| | | | | | | 362/260 |
| 8,033,683 | B2 | * | 10/2011 | Fields | ....................... | F21V 7/00 |
| | | | | | | 362/231 |
| 8,573,802 | B2 | * | 11/2013 | Hong | ..................... | F21V 7/0008 |
| | | | | | | 362/241 |
| 9,151,461 | B1 | * | 10/2015 | Kuo | ...................... | F21S 48/2212 |
| 2006/0291209 | A1 | * | 12/2006 | Booth | ................... | F21V 7/0008 |
| | | | | | | 362/247 |
| 2011/0157899 | A1 | * | 6/2011 | Ko | ......................... | G02B 6/0061 |
| | | | | | | 362/307 |

* cited by examiner

*Primary Examiner* — Jong-Suk (James) Lee
*Assistant Examiner* — Bryon T Gyllstrom

(57) ABSTRACT

A lens structure for a vehicular lamp includes an incident portion surrounding a central axis. The incident portion includes a first inner annular face, a first outer annular face, and an incident face behind the first inner annular face and the first outer annular face. A rear end of a light mixing portion located in front of the incident portion is connected to a front end of the incident portion. The light mixing portion further includes a first reflective face on an inner side thereof and a second reflective face on an outer side thereof. The second reflective face has continuous toothed faces. A light output portion is located in front of the light mixing portion. A rear end of the light output portion is connected to a front end of the light mixing portion. The front end of the light output portion includes a light output face.

6 Claims, 6 Drawing Sheets

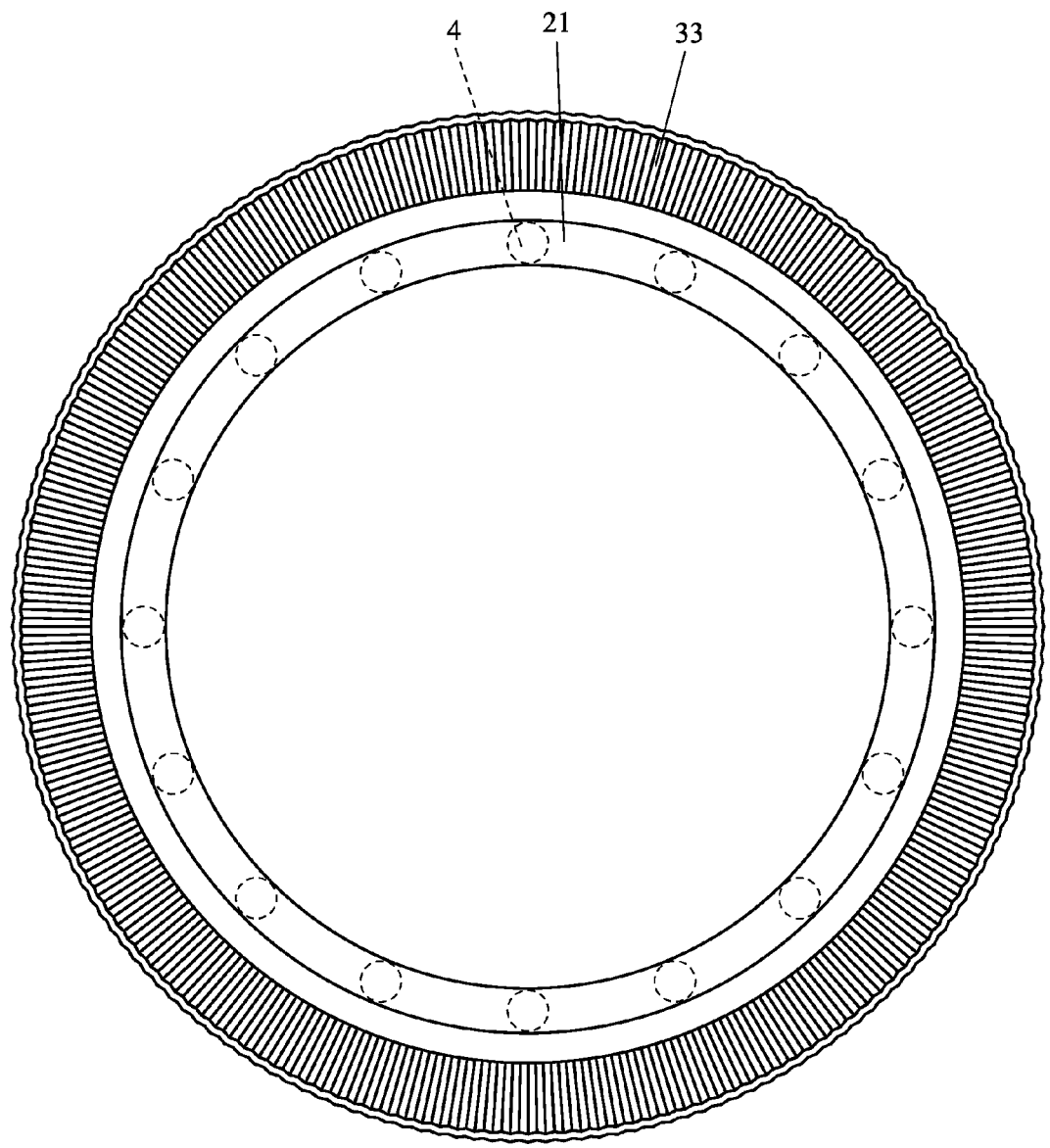
F I G . 4

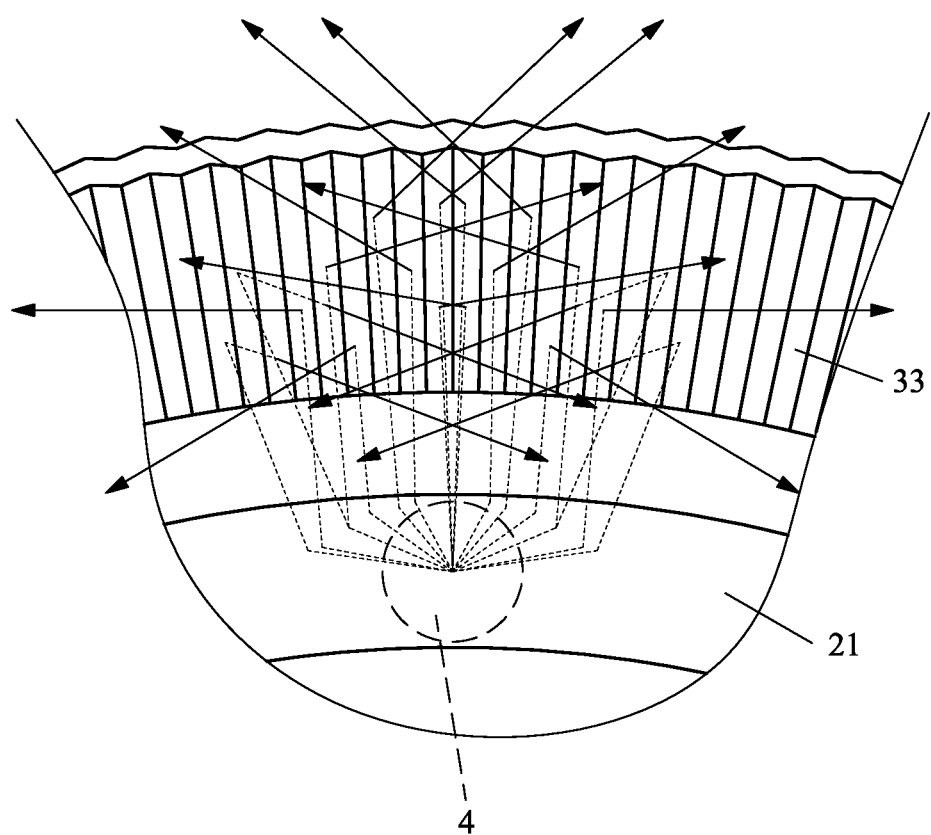
F I G . 6

LENS STRUCTURE FOR A VEHICULAR LAMP

BACKGROUND OF THE INVENTION

The present invention relates to a lens structure for a vehicular lamp and, more particularly, to a lens structure for a vehicular lamp capable of providing a uniform annular light output effect.

Conventional vehicular lamps generally include a lens in front of a lighting element such that the light rays emitted from the lighting element can transmit the lens. To increase the lighting and alarming effect, current vehicular lamps includes an annular lighting arrangement in which a plurality of annularly arranged lighting elements (such as light emitting diodes) is provided behind the lens of the vehicular lamp, such that the lighting elements can provide an annular lighting pattern.

However, when viewed from the front of the lens, the area corresponding to the lighting elements is brighter than other area not corresponding to the lighting elements, presenting obvious local point lights and uneven annular light output.

In an attempt to overcome the above disadvantage, a reflective groove capable of diffusing light can be provided behind the lens in a location corresponding to each lighting element such that the light rays emitted by the lighting element can be split by the reflective groove to provide uniform and increased luminance. However, each lighting element requires a corresponding reflective groove, leading to a limitation to the number of the lighting elements. Furthermore, the light mixing effect is still unsatisfactory, because the light rays emitted by each lighting element directly transmit outside of the lens after having been diffused by the corresponding reflective groove.

BRIEF SUMMARY OF THE INVENTION

An objective of the present invention is to provide a lens structure capable of providing a uniform annular light output effect.

A lens structure for a vehicular lamp according to the present invention includes an incident portion, a light mixing portion a light mixing portion, and a light output portion. The incident portion is annular and surrounds a central axis. The incident portion includes a first inner annular face and a first outer annular face spaced from the first inner annular face in a radial direction perpendicular to the central axis. The incident portion further includes an incident face behind the first inner annular face and the first outer annular face. The incident face is plane. The light mixing portion is located in front of the incident portion. The light mixing portion includes a front end and a rear end spaced from the front end along the central axis. The rear end of the light mixing portion is connected to a front end of the incident portion. The light mixing portion extends outward from the rear end thereof towards the front end thereof in the radial direction perpendicular to the central axis. The light mixing portion further includes a first reflective face on an inner side thereof and a second reflective face on an outer side thereof spaced from the first reflective face in the radial direction. The second reflective face has a plurality of continuous toothed faces. The light output portion is located in front of the light mixing portion. The light output portion includes a rear end and a front end spaced from the rear end of the light output portion along the central axis. The rear end of the light output portion is connected to the front end of the light mixing portion. The front end of the light output portion includes a light output face. Most part of light rays from a light source is adapted to directly enter the lens structure via the incident face of the incident portion, is adapted to be reflected by the first reflective face to the second reflective face, is adapted to be reflected by the second reflective face to the first reflective face, and is adapted to be emitted via the light output face of the light output portion after a plurality of times of reflection, splitting, and mixing of the light rays.

The incident face can extend perpendicularly to the central axis.

In an embodiment, the plurality of continuous toothed faces extends in a circumferential direction about the central axis.

In an embodiment, the light output face includes plurality of continuous toothed faces extending in a circumferential direction about the central axis.

The first reflective face can be connected to and at an obtuse angle to a front end of the first inner annular fac. The second reflective face can be connected to and at an obtuse angle to a front end of the first outer annular face.

The light output portion can include a second inner annular face and a second outer annular face spaced from the second inner annular face in the radial direction perpendicular to the central axis. The light output face is located in front of the second inner annular face and the second outer annular face.

A plurality of annularly arranged lighting elements (such as light emitting diodes) can be mounted behind the incident face. The light rays emitted by each lighting element directly enter the incident portion and the light mixing portion via the plane incident face. Most part of the light rays can be totally reflected by the first reflective face to the second reflective face. The toothed faces of the second reflective face split the reflected light rays, and the main portion of the light rays are directed to and emitted via the light output portion during splitting. The remaining portion of the light rays is reflected to the first reflective face in different angular positions, and these light rays can be reflected again to the second reflective face. Thus, the light rays can be repeatedly reflected in the light mixing portion to generate a plurality of times of splitting, providing a first light mixing effect. After light mixing, the light rays reflected to the light output portion can transmit the light output face. The toothed faces of the light output face can provide a second splitting of the light rays, such that a uniform annular light output effect can be presented as viewed from a front of the lens.

The present invention will become clearer in light of the following detailed description of illustrative embodiments of this invention described in connection with the drawings.

DESCRIPTION OF THE DRAWINGS

FIG. 4 is a front elevational view of the lens structure of FIG. 1 with a plurality of lighting elements mounted behind the lens structure.

FIG. 6 is a partial, front elevational view of the lens structure of FIG. 4, illustrating the lighting effect of one of the lighting elements.

DETAILED DESCRIPTION OF THE INVENTION

Figure 1:
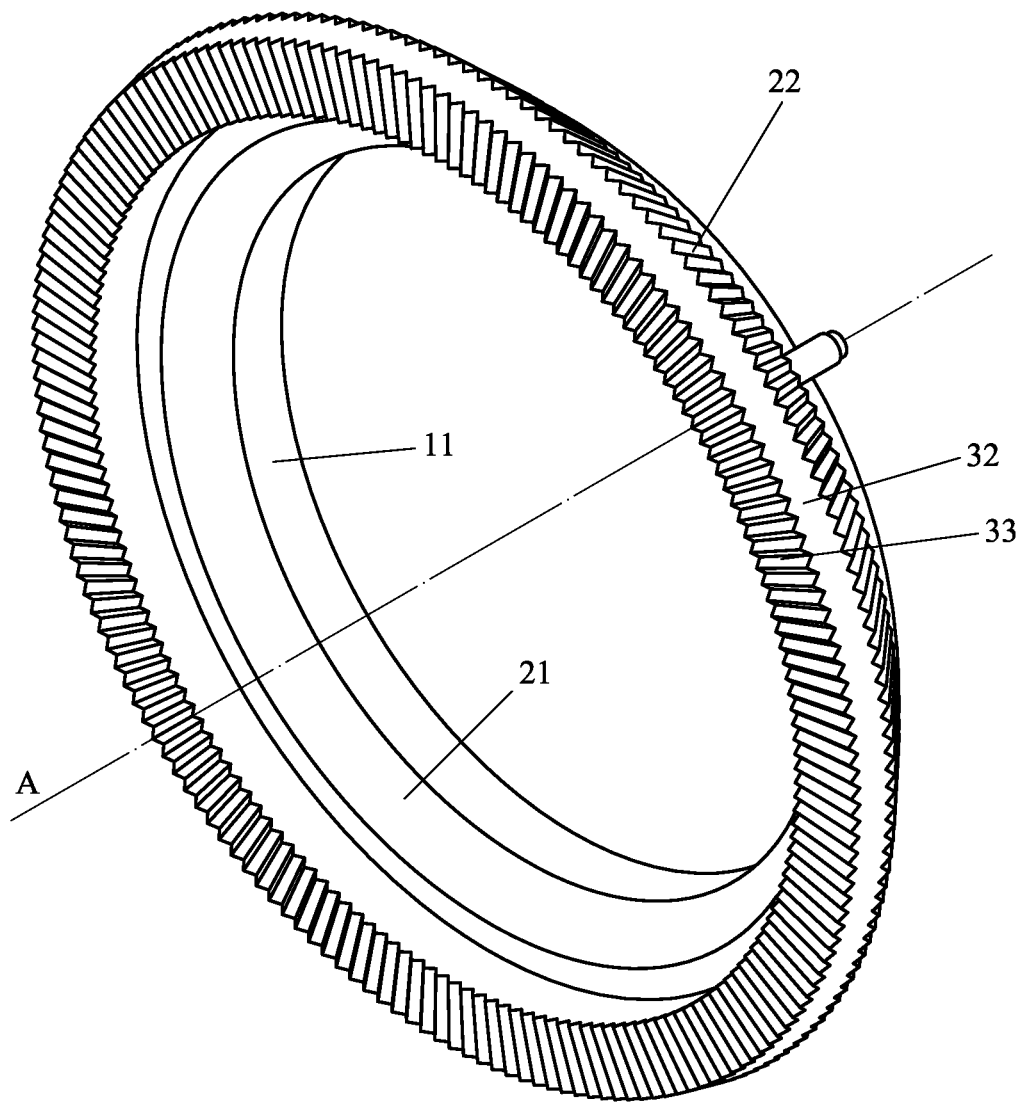
FIG. 1 is a front, perspective view of a lens structure for a vehicular lamp according to the present invention.
Figure 2:
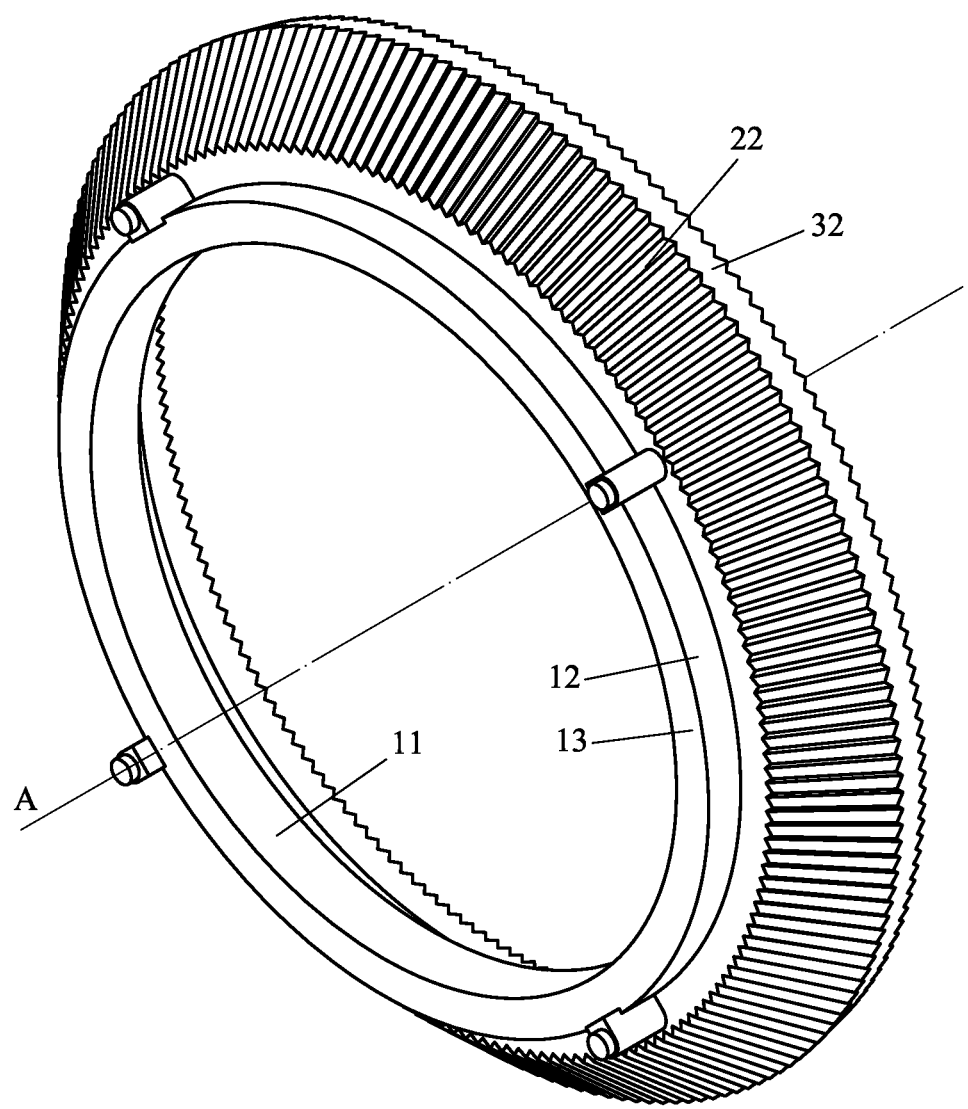
FIG. 2 is a rear, perspective view of the lens structure of FIG. 1.
Figure 3:
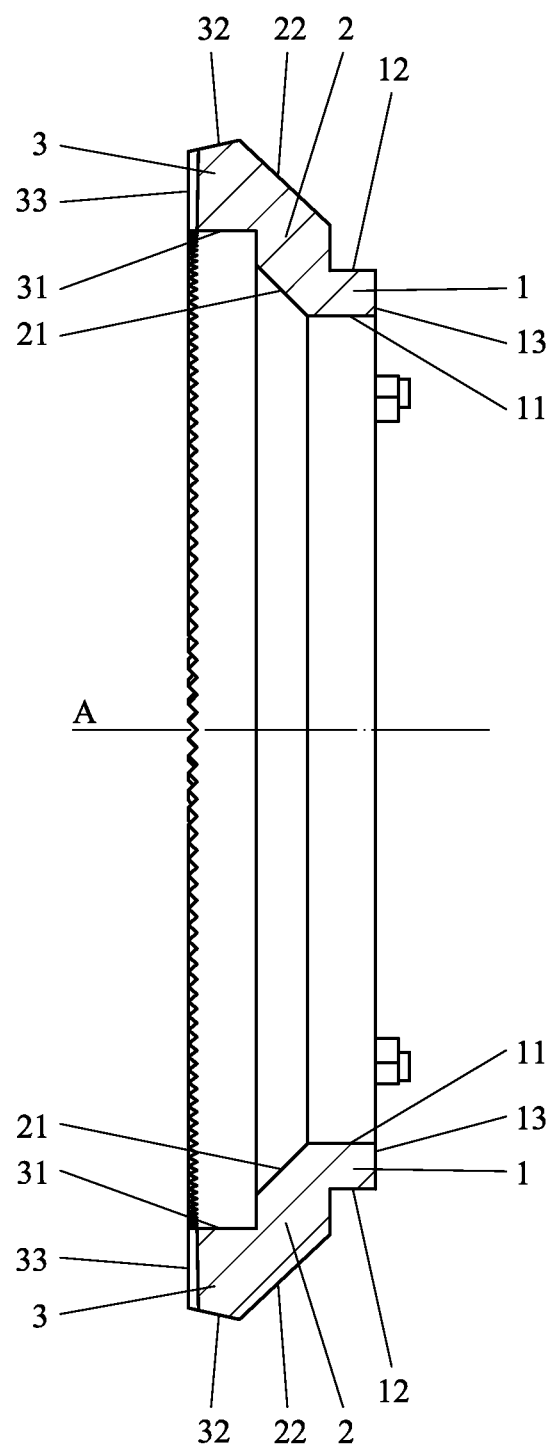
FIG. 3 is a cross sectional view of the lens structure of FIG. 1.

With reference to FIGS. 1-3, a lens structure for a vehicular lamp according to the present invention includes an incident portion 1, a light mixing portion 2, and a light output portion 3. The incident portion 1 is annular and surrounds a central axis A. The incident portion 1 includes a first inner annular face 11 and a first outer annular face 12 spaced from the first inner annular face 11 in a radial direction perpendicular to the central axis A. The incident portion 1 further includes an incident face 13 behind the first inner annular face 11 and the first outer annular face 12. The incident face 13 extends perpendicularly to the central axis A. In the form shown, the incident face 13 is plane and is without a matte effect.

The light mixing portion 2 is located in front of the incident portion 1. The light mixing portion 2 includes a front end and a rear end spaced from the front end along the central axis A. The rear end of the light mixing portion 2 is connected to a front end of the incident portion 1. The light mixing portion 2 extends outward from the rear end thereof towards the front end thereof in the radial direction perpendicular to the central axis A. The light mixing portion 2 further includes a first reflective face 21 on an inner side thereof and a second reflective face 22 on an outer side thereof spaced from the first reflective face 21 in the radial direction. The first reflective face 21 is connected to and is at an obtuse angle to a front end of the first inner annular face 11. The second reflective face 22 is connected to and is at an obtuse angle to a front end of the first outer annular face 12. The second reflective face 22 has a plurality of continuous toothed faces extending in a circumferential direction about the central axis A.

The light output portion 3 is located in front of the light mixing portion 2. The light output portion 3 includes a rear end and a front end spaced from the rear end of the light output portion 3 along the central axis A. The rear end of the light output portion 3 is connected to the front end of the light mixing portion 2. The light output portion 3 includes a second inner annular face 31 and a second outer annular face 32 spaced from the second inner annular face 31 in the radial direction perpendicular to the central axis A. The front end of the light output portion 3 includes a light output face 33 parallel to the incident face 13. The light output face 33 is located in front of the second inner annular face 31 and the second outer annular face 32. The light output face 33 includes a plurality of continuous toothed faces extending in a circumferential direction about the central axis A.

Figure 5:
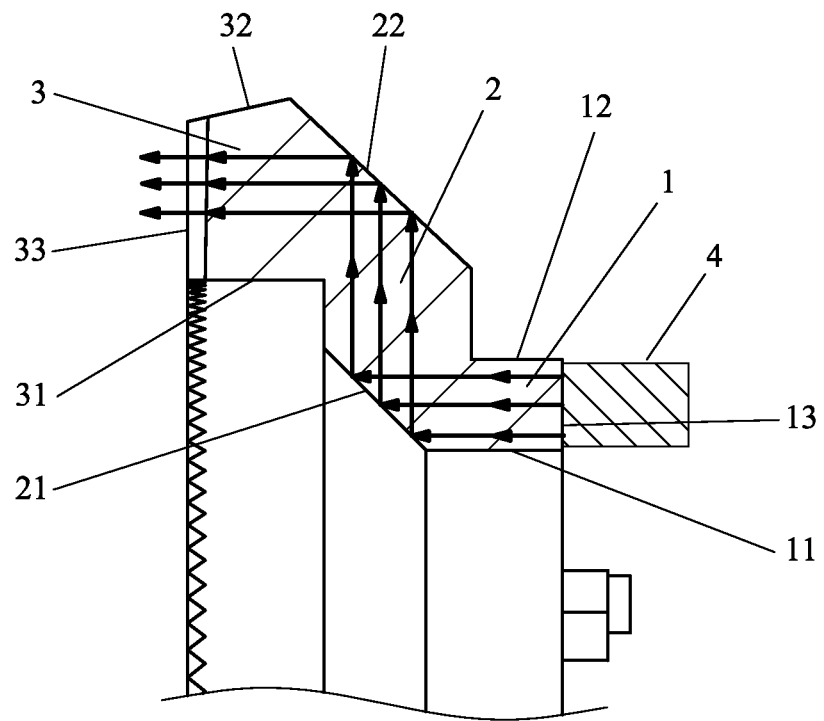
FIG. 5 is a partial, cross sectional view of the lens structure of FIG. 4, illustrating a lighting effect of one of the lighting elements.

With reference to FIGS. 4-6, a plurality of annularly arranged lighting elements 4 (such as light emitting diodes) is adapted to be mounted behind the incident face 13. The light rays emitted by each lighting element 4 directly enter the incident portion 1 and the light mixing portion 12 via the plane incident face 13. Most part of the light rays can be totally reflected by the first reflective face 21 to the second reflective face 22. The toothed faces of the second reflective face 22 split the reflected light rays, and the main portion of the light rays are directed to and emitted via the light output portion 3 during splitting. The remaining portion of the light rays is reflected to the first reflective face 21 in different angular positions, and these light rays can be reflected again to the second reflective face 22. Thus, the light rays can be repeatedly reflected in the light mixing portion 2 to generate a plurality of times of splitting, providing a first light mixing effect. When the light rays after light mixing are reflected to the light output portion 3, most part of these light rays can transmit the light output face 33, and a portion of these light rays can be reflected by the second inner annular face 31 and the second outer annular face 32 or can directly transmit the second inner annular face 31 and the second outer annular face 32 (not depicted in the drawings). The toothed faces of the light output face 33 can provide a second splitting of the light rays, such that a uniform annular light output effect can be presented as viewed from a front of the lens. Local point light sources will not be generated.

Since the incident face 13 of the incident portion 1 is plane 1, it is not necessary to provide light-diffusing reflective grooves or any light splitting structure corresponding to the location of the lighting elements 4. Thus, the lighting elements 4 can be arranged behind the incident face 13, and a desired number of lighting elements 4 can be mounted according to the lighting demand. Furthermore, the plane incident face 13 can effectively guide the light rays from each lighting element 4 into the incident portion 1 and can be reflected and mixed many times in the light mixing portion 2, such that a uniform lighting effect can be provided when the light rays are reflected from the light mixing portion 2 to the light output portion 3. Furthermore, the light rays can be split by the toothed faces of the light output face 33 to provide a double light mixing effect, further increasing the uniformity of the annular light output. The lens structure according to the present invention is suitable for a tail light, daytime running light, or any other applications, providing increased alarm effect and safety.

Furthermore, since the area surrounded by the light output face 33 is larger than that surrounded by the incident face 13, the lighting elements 4 arranged in a small area is sufficient to provide a light output effect covering a wider area, increasing the lighting and alarming effect.

In view of the foregoing, the lens structure according to the present invention provides a more uniform luminance effect. The light mixing portion 2 provides an excellent light mixing effect such that the light output face 33 can provide a uniform light output even if the light output face 33 does not include the continuous toothed faces.

Although specific embodiments have been illustrated and described, numerous modifications and variations are still possible without departing from the scope of the invention. The scope of the invention is limited by the accompanying claims.

The invention claimed is:

1. A lens structure for a vehicular lamp comprising:
    an incident portion, with the incident portion being annular and surrounding a central axis, with the incident portion including a first inner annular face and a first outer annular face spaced from the first inner annular face in a radial direction perpendicular to the central axis, with the incident portion further including an incident face behind the first inner annular face and the first outer annular face, and with the incident face being plane;
    a light mixing portion located in front of the incident portion, with the light mixing portion including a front end and a rear end spaced from the front end along the central axis, with the rear end of the light mixing portion connected to a front end of the incident portion, with the light mixing portion extending outward from the rear end thereof towards the front end thereof in the radial direction perpendicular to the central axis, with the light mixing portion further including a first reflective face on an inner side thereof and a second reflective face on an outer side thereof spaced from the first reflective face in the radial direction, and with the second reflective face having a plurality of continuous toothed faces; and
    a light output portion located in front of the light mixing portion, with the light output portion including a rear end and a front end spaced from the rear end of the light output portion along the central axis, with the rear end of the light output portion connected to the front end of the light mixing portion, with the front end of the light output portion including a light output face, with most part of light rays from a light source adapted to directly enter the lens structure via the incident face of the incident portion, adapted to be reflected by the first reflective face to the second reflective face, adapted to be reflected by the second reflective face to the first reflective face, and adapted to be emitted via the light output face of the light output portion after a plurality of times of reflection, splitting, and mixing of the light rays.

2. The lens structure for a vehicular lamp as claimed in claim 1, wherein the incident face extends perpendicularly to the central axis.

3. The lens structure for a vehicular lamp as claimed in claim 1, wherein the plurality of continuous toothed faces extends in a circumferential direction about the central axis.

4. The lens structure for a vehicular lamp as claimed in claim 1, wherein the light output face includes plurality of continuous toothed faces extending in a circumferential direction about the central axis.

5. The lens structure for a vehicular lamp as claimed in claim 4, with the first reflective face connected to and at an obtuse angle to a front end of the first inner annular face, and with the second reflective face connected to and at an obtuse angle to a front end of the first outer annular face.

6. The lens structure for a vehicular lamp as claimed in claim 5, with the light output portion including a second inner annular face and a second outer annular face spaced from the second inner annular face in the radial direction perpendicular to the central axis, and with the light output face located in front of the second inner annular face and the second outer annular face.

* * * * *